US012784613B2

(12) United States Patent
Kato et al.

(10) Patent No.: US 12,784,613 B2
(45) Date of Patent: Nov. 3, 2026

(54) PROVIDING WORKOUT RECAP

(71) Applicant: NIKE, Inc., Beaverton, OR (US)

(72) Inventors: Tagu Kato, Beaverton, OR (US); Adam Tenuta, Portland, OR (US); Alvin Helmandi, London (GB); Davor Krvavac, London (GB); Masaya Nakade, London (GB); Brian Snyder, London (GB)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 17/227,979

(22) Filed: Apr. 12, 2021

(65) Prior Publication Data

US 2021/0280082 A1 Sep. 9, 2021

Related U.S. Application Data

(63) Continuation of application No. 15/248,657, filed on Aug. 26, 2016, now Pat. No. 11,004,356.

(60) Provisional application No. 62/210,320, filed on Aug. 26, 2015.

(51) Int. Cl.

| | |
|---|---|
| ***G09B 19/00*** | (2006.01) |
| ***G09B 5/12*** | (2006.01) |
| *A63B 24/00* | (2006.01) |
| *G06T 7/20* | (2017.01) |
| *G06V 20/40* | (2022.01) |
| *G06V 20/52* | (2022.01) |
| *G11B 27/028* | (2006.01) |
| *G11B 27/031* | (2006.01) |

(52) U.S. Cl.
CPC ......... *G09B 19/0038* (2013.01); *G09B 5/125* (2013.01); *A63B 2024/0081* (2013.01); *G06T 7/20* (2013.01); *G06T 2207/10016* (2013.01); *G06V 20/40* (2022.01); *G06V 20/41* (2022.01); *G06V 20/44* (2022.01); *G06V 20/52* (2022.01); *G09B 19/003* (2013.01); *G11B 27/028* (2013.01); *G11B 27/031* (2013.01)

(58) Field of Classification Search
CPC .. G09B 19/0038; G09B 5/125; G09B 19/003; A63B 2024/0081; G06T 7/20; G06T 2207/10016; G06V 20/40; G06V 20/41; G06V 20/44; G06V 20/52; G11B 27/028; G11B 27/031
See application file for complete search history.

(56) References Cited

U.S. PATENT DOCUMENTS

2009/0044237 A1 2/2009 Keiter
2012/0251079 A1* 10/2012 Meschter ................ G16Z 99/00 386/278
2014/0313341 A1* 10/2014 Stribling .............. H04N 23/632 348/157
2014/0375817 A1 12/2014 Meschter et al.
(Continued)

*Primary Examiner* — Jack Yip
(74) *Attorney, Agent, or Firm* — Banner & Witcoff, Ltd.

(57) ABSTRACT

Athletic activity may be tracked while providing encouragement to perform athletic activity. For example, a user's route may be captured during a workout and used to assemble a media presentation corresponding to the workout. Prior captured images may be assembled forming a hyperlapse video and included in a media presentation corresponding to a user's workout. Images representing locations along a workout route may be assembled and provided in the media presentation and may be shared with other users.

20 Claims, 8 Drawing Sheets

(56) References Cited

U.S. PATENT DOCUMENTS

| | | | | |
|---|---|---|---|---|
| 2015/0081055 | A1 | 3/2015 | Erkkila et al. | |
| 2015/0155007 | A1 | 6/2015 | Barfield, Jr. et al. | |
| 2015/0317801 | A1 * | 11/2015 | Bentley | G08B 21/043 382/107 |
| 2016/0055381 | A1 * | 2/2016 | Adsumilli | G11B 27/3081 386/241 |
| 2016/0247537 | A1 | 8/2016 | Ricciardi | |
| 2016/0250519 | A1 | 9/2016 | Watterson | |
| 2017/0052035 | A1 * | 2/2017 | Dorum | G06V 20/56 |
| 2017/0263147 | A1 | 9/2017 | King et al. | |
| 2017/0270224 | A1 * | 9/2017 | Singh | G06Q 30/0643 |

* cited by examiner

PROVIDING WORKOUT RECAP

CROSS-REFERENCE TO RELATED APPLICATIONS

This is application is a continuation of U.S. application Ser. No. 15/248,657, filed Aug. 26, 2016, which is a non-provisional of and claims priority to U.S. Provisional Application No. 62/210,320, filed Aug. 26, 2015, which prior applications are incorporated herein by reference in its entirety for any and all non-limiting purposes.

BACKGROUND

While most people appreciate the importance of physical fitness, many have difficulty finding the motivation required to maintain a regular exercise program. For some people, keeping statistics or records of their exercise and referring back to prior workouts may provide motivation to continue exercising and improving their fitness. In addition, the sharing of information about a workout with others may help a user stay motivated.

Recently, cameras have become available which are small enough to be carried during a workout. For example, such a camera may be mounted on a user's helmet and record images while a user rides a bike. Further, mobile devices have made image capture devices ubiquitous, thus the user and/or other athletes within visual sight of the user may use one or more image capturing devices to capture at least a portion of an athletic activity. For example, a user may carry such a camera while running. Images captured by the camera can be later assembled and played back as a video, allowing the user to relive a workout. In order to reduce the time required to relive the workout, software applications have become available enabling a user to create hyperlapse videos from a collection of images. A hyperlapse video is a time-lapse video, assembled from images taken over a distance.

Currently, if a user wants to create a hyperlapse video of a route they have previously ran or biked, they may use a camera to take pictures as they are running or biking and then create a hyperlapse video using hyperlapse media generation software. While many users may enjoy having a hyperlapse video of their workout, few users want to carry a camera or make the effort to assemble the images into a hyperlapse video.

Therefore, improved systems and methods to address these and other shortcomings in the art are desired.

BRIEF SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of this disclosure relate to providing a media presentation, including hyperlapse video, corresponding to a user's workout. In certain embodiments, images representing locations along a workout route may be assembled and provided in the media presentation. One or more devices may use an accelerometer and/or other sensors to monitor activity of a user, including the user's location. Under certain implementations, the media presentation may be shared with other users.

In some embodiments, the present invention may be partially or wholly implemented on a computer-readable medium, for example, by storing computer-executable instructions or modules, or by utilizing computer-readable data structures.

Of course, the methods and systems of the above-referenced embodiments may also include other additional elements, steps, computer-executable instructions, or computer-readable data structures.

The details of these and other embodiments of the present invention are set forth in the accompanying drawings and the description below. Other features and advantages of the invention will be apparent from the description and drawings, and from the claims.

DETAILED DESCRIPTION

Aspects of this disclosure involve obtaining, storing, and/or processing athletic data relating to the physical movements of an athlete. The athletic data may be actively or passively sensed and/or stored in one or more non-transitory storage mediums. Still further aspects relate to using athletic data to generate an output, such as for example, calculated athletic attributes, feedback signals to provide guidance, and/or other information. These and other aspects will be discussed in the context of the following illustrative examples of a personal training system.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope and spirit of the present disclosure. Further, headings within this disclosure should not be considered as limiting aspects of the disclosure and the example embodiments are not limited to the example headings.

I. Example Personal Training System

A. Illustrative Networks

Figure 1:
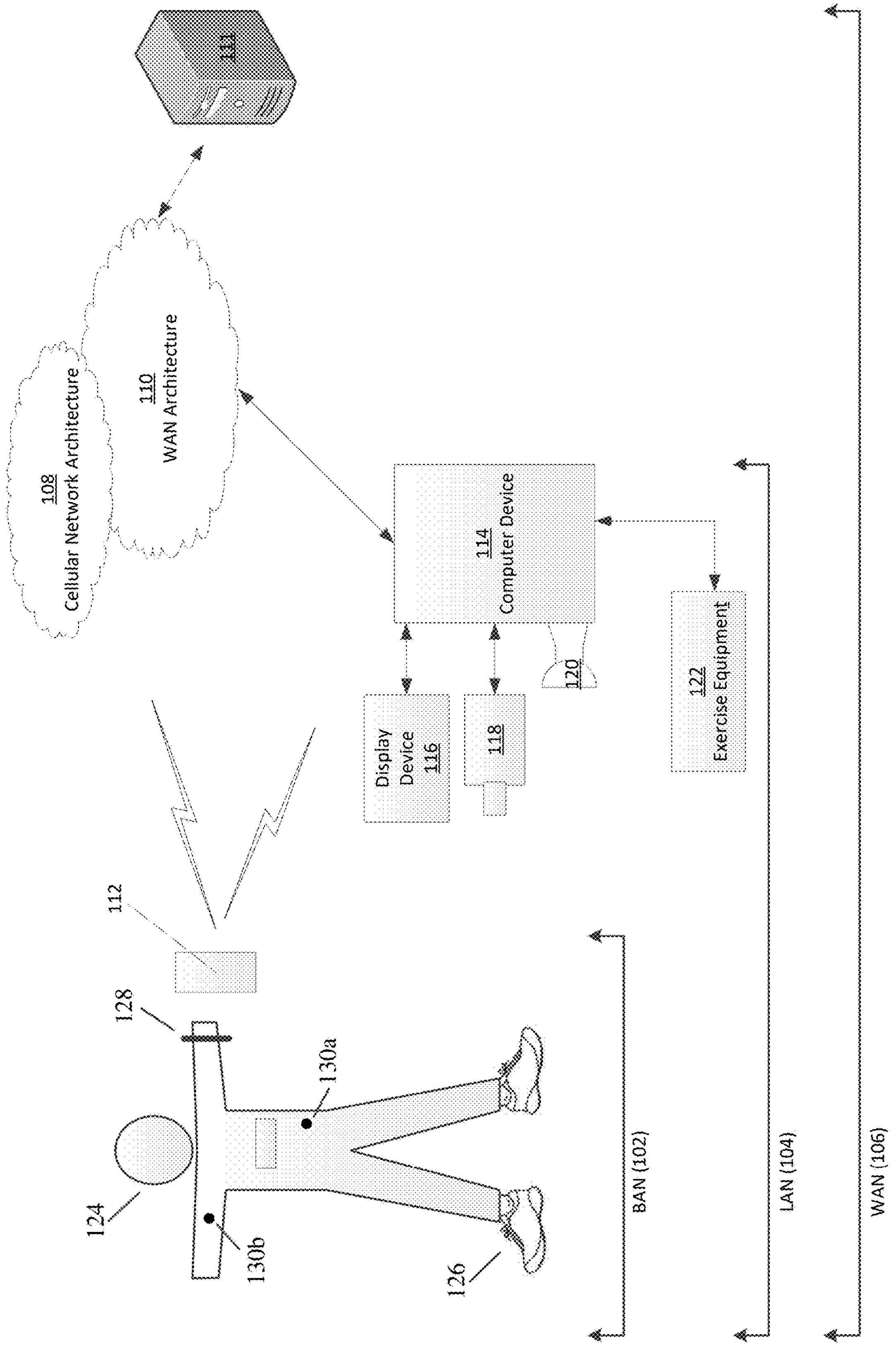
FIG. 1 illustrates an example system that may be configured to provide personal training and/or obtain data from the physical movements of a user in accordance with example embodiments.

Aspects of this disclosure relate to systems and methods that may be utilized across a plurality of networks. In this regard, certain embodiments may be configured to adapt to dynamic network environments. Further embodiments may be operable in differing discrete network environments. FIG. 1 illustrates an example of a personal training system 100 in accordance with example embodiments. Example system 100 may include one or more interconnected networks, such as the illustrative body area network (BAN) 102, local area network (LAN) 104, and wide area network (WAN) 106. As shown in FIG. 1 (and described throughout this disclosure), one or more networks (e.g., BAN 102, LAN 104, and/or WAN 106), may overlap or otherwise be inclusive of each other. Those skilled in the art will appreciate that the illustrative networks 102-106 are logical networks that may each comprise one or more different communication protocols and/or network architectures and yet may be configured to have gateways to each other or other networks. For example, each of BAN 102, LAN 104 and/or WAN 106 may be operatively connected to the same physical network architecture, such as cellular network architecture 108 and/or WAN architecture 110. For example, portable electronic device 112, which may be considered a component of both BAN 102 and LAN 104, may comprise a network adapter or network interface card (NIC) configured to translate data and control signals into and from network messages according to one or more communication protocols, such as the Transmission Control Protocol (TCP), the Internet Protocol (IP), and the User Datagram Protocol (UDP) through one or more of architectures 108 and/or 110. These protocols are well known in the art, and thus will not be discussed here in more detail.

Network architectures 108 and 110 may include one or more information distribution network(s), of any type(s) or topology(s), alone or in combination(s), such as for example, cable, fiber, satellite, telephone, cellular, wireless, etc. and as such, may be variously configured such as having one or more wired or wireless communication channels (including but not limited to: WiFi®, Bluetooth®, Near-Field Communication (NFC) and/or ANT technologies). Thus, any device within a network of FIG. 1, (such as portable electronic device 112 or any other device described herein) may be considered inclusive to one or more of the different logical networks 102-106. With the foregoing in mind, example components of an illustrative BAN and LAN (which may be coupled to WAN 106) will be described.

1. Example Local Area Network

LAN 104 may include one or more electronic devices, such as for example, computer device 114. Computer device 114, or any other component of system 100, may comprise a mobile terminal, such as a telephone, music player, tablet, netbook or any portable device. In other embodiments, computer device 114 may comprise a media player or recorder, desktop computer, server(s), a gaming console, such as for example, a Microsoft® XBOX, Sony® Playstation, and/or a Nintendo® Wii gaming consoles. Those skilled in the art will appreciate that these are merely example devices for descriptive purposes and this disclosure is not limited to any console or computing device.

Figure 2:
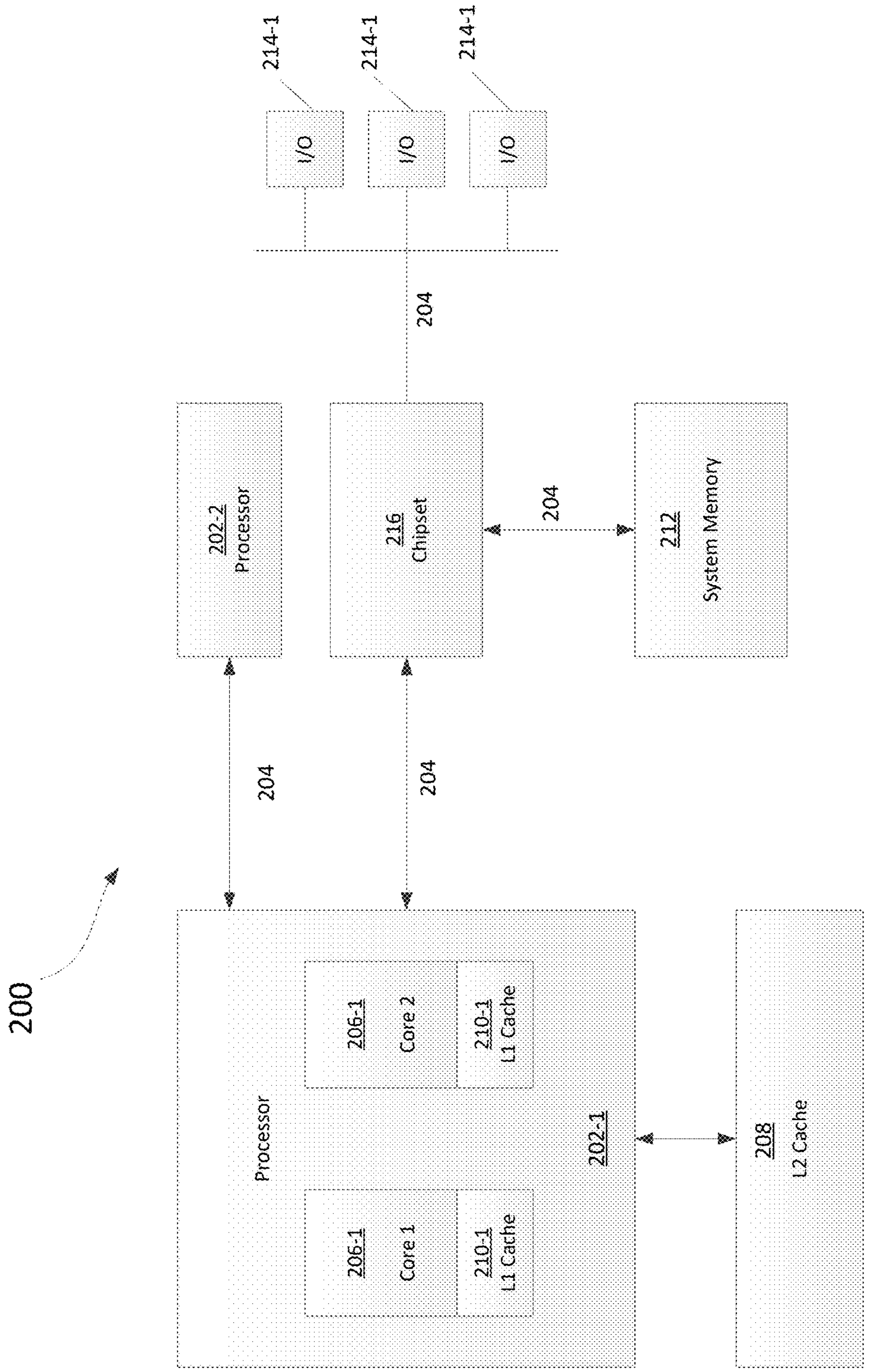
FIG. 2 illustrates an example computer device that may be part of or in communication with the system of FIG. 1.

Those skilled in the art will appreciate that the design and structure of computer device 114 may vary depending on several factors, such as its intended purpose. One example implementation of computer device 114 is provided in FIG. 2, which illustrates a block diagram of computing device 200. Those skilled in the art will appreciate that the disclosure of FIG. 2 may be applicable to any device disclosed herein. Device 200 may include one or more processors, such as processor 202-1 and 202-2 (generally referred to herein as "processors 202" or "processor 202"). Processors 202 may communicate with each other or other components via an interconnection network or bus 204. Processor 202 may include one or more processing cores, such as cores 206-1 and 206-2 (referred to herein as "cores 206" or more generally as "core 206"), which may be implemented on a single integrated circuit (IC) chip.

Cores 206 may comprise a shared cache 208 and/or a private cache (e.g., caches 210-1 and 210-2, respectively). One or more caches 208/210 may locally cache data stored in a system memory, such as memory 212, for faster access by components of the processor 202. Memory 212 may be in communication with the processors 202 via a chipset 216. Cache 208 may be part of system memory 212 in certain embodiments. Memory 212 may include, but is not limited to, random access memory (RAM), read only memory (ROM), and include one or more of solid-state memory, optical or magnetic storage, and/or any other medium that can be used to store electronic information. Yet other embodiments may omit system memory 212.

System 200 may include one or more I/O devices (e.g., I/O devices 214-1 through 214-3, each generally referred to as I/O device 214). I/O data from one or more I/O devices 214 may be stored at one or more caches 208, 210 and/or system memory 212. Each of I/O devices 214 may be permanently or temporarily configured to be in operative communication with a component of system 100 using any physical or wireless communication protocol.

Returning to FIG. 1, four example I/O devices (shown as elements 116-122) are shown as being in communication with computer device 114. Those skilled in the art will appreciate that one or more of devices 116-122 may be stand-alone devices or may be associated with another device besides computer device 114. For example, one or more I/O devices may be associated with or interact with a component of BAN 102 and/or WAN 106. I/O devices 116-122 may include, but are not limited to athletic data acquisition units, such as for example, sensors. One or more I/O devices may be configured to sense, detect, and/or measure an athletic parameter from a user, such as user 124. Examples include, but are not limited to: an accelerometer, a gyroscope, a location-determining device (e.g., GPS), light (including non-visible light) sensor, temperature sensor (including ambient temperature and/or body temperature), sleep pattern sensors, heart rate monitor, image-capturing sensor, moisture sensor, force sensor, compass, angular rate sensor, and/or combinations thereof among others.

In further embodiments, I/O devices 116-122 may be used to provide an output (e.g., audible, visual, or tactile cue) and/or receive an input, such as a user input from athlete 124. Example uses for these illustrative I/O devices are provided below, however, those skilled in the art will appreciate that such discussions are merely descriptive of some of the many options within the scope of this disclosure. Further, reference to any data acquisition unit, I/O device, or sensor is to be interpreted disclosing an embodiment that may have one or more I/O device, data acquisition unit, and/or sensor disclosed herein or known in the art (either individually or in combination).

Information from one or more devices (across one or more networks) may be used to provide (or be utilized in the formation of) a variety of different parameters, metrics or physiological characteristics including but not limited to: motion parameters, such as speed, acceleration, distance, steps taken, direction, relative movement of certain body portions or objects to others, or other motion parameters which may be expressed as angular rates, rectilinear rates or combinations thereof, physiological parameters, such as calories, heart rate, sweat detection, effort, oxygen consumed, oxygen kinetics, and other metrics which may fall within one or more categories, such as: pressure, impact forces, information regarding the athlete, such as height, weight, age, demographic information and combinations thereof.

System 100 may be configured to transmit and/or receive athletic data, including the parameters, metrics, or physiological characteristics collected within system 100 or otherwise provided to system 100. As one example, WAN 106 may comprise server 111. Server 111 may have one or more components of system 200 of FIG. 2. In one embodiment, server 111 comprises at least a processor and a memory, such as processor 206 and memory 212. Server 111 may be configured to store computer-executable instructions on a non-transitory computer-readable medium. The instructions may comprise athletic data, such as raw or processed data collected within system 100. System 100 may be configured to transmit data, such as energy expenditure points, to a social networking website or host such a site. Server 111 may be utilized to permit one or more users to access and/or compare athletic data. As such, server 111 may be configured to transmit and/or receive notifications based upon athletic data or other information.

Returning to LAN 104, computer device 114 is shown in operative communication with a display device 116, an image-capturing device 118, sensor 120 and exercise device 122, which are discussed in turn below with reference to example embodiments. In one embodiment, display device 116 may provide audio-visual cues to athlete 124 to perform a specific athletic movement. The audio-visual cues may be provided in response to computer-executable instruction executed on computer device 114 or any other device, including a device of BAN 102 and/or WAN. Display device 116 may be a touchscreen device or otherwise configured to receive a user-input.

In one embodiment, data may be obtained from image-capturing device 118 and/or other sensors, such as sensor 120, which may be used to detect (and/or measure) athletic parameters, either alone or in combination with other devices, or stored information. Image-capturing device 118 and/or sensor 120 may comprise a transceiver device. In one embodiment sensor 128 may comprise an infrared (IR), electromagnetic (EM) or acoustic transceiver. For example, image-capturing device 118, and/or sensor 120 may transmit waveforms into the environment, including towards the direction of athlete 124 and receive a "reflection" or otherwise detect alterations of those released waveforms. Those skilled in the art will readily appreciate that signals corresponding to a multitude of different data spectrums may be utilized in accordance with various embodiments. In this regard, devices 118 and/or 120 may detect waveforms emitted from external sources (e.g., not system 100). For example, devices 118 and/or 120 may detect heat being emitted from user 124 and/or the surrounding environment. Thus, image-capturing device 126 and/or sensor 128 may comprise one or more thermal imaging devices. In one embodiment, image-capturing device 126 and/or sensor 128 may comprise an IR device configured to perform range phenomenology.

In one embodiment, exercise device 122 may be any device configurable to permit or facilitate the athlete 124 performing a physical movement, such as for example a treadmill, step machine, etc. There is no requirement that the device be stationary. In this regard, wireless technologies permit portable devices to be utilized, thus a bicycle or other mobile exercising device may be utilized in accordance with certain embodiments. Those skilled in the art will appreciate that equipment 122 may be or comprise an interface for receiving an electronic device containing athletic data performed remotely from computer device 114. For example, a user may use a sporting device (described below in relation to BAN 102) and upon returning home or the location of equipment 122, download athletic data into element 122 or any other device of system 100. Any I/O device disclosed herein may be configured to receive activity data.

2. Body Area Network

BAN 102 may include two or more devices configured to receive, transmit, or otherwise facilitate the collection of athletic data (including passive devices). Exemplary devices may include one or more data acquisition units, sensors, or devices known in the art or disclosed herein, including but not limited to I/O devices 116-122. Two or more components of BAN 102 may communicate directly, yet in other embodiments, communication may be conducted via a third device, which may be part of BAN 102, LAN 104, and/or WAN 106. One or more components of LAN 104 or WAN 106 may form part of BAN 102. In certain implementations, whether a device, such as portable device 112, is part of BAN 102, LAN 104, and/or WAN 106, may depend on the athlete's proximity to an access point to permit communication with mobile cellular network architecture 108 and/or WAN architecture 110. User activity and/or preference may also influence whether one or more components are utilized as part of BAN 102. Example embodiments are provided below.

User 124 may be associated with (e.g., possess, carry, wear, and/or interact with) any number of devices, such as portable device 112, shoe-mounted device 126, wrist-worn device 128 and/or a sensing location, such as sensing location 130, which may comprise a physical device or a location that is used to collect information. One or more devices 112, 126, 128, and/or 130 may not be specially designed for fitness or athletic purposes. Indeed, aspects of this disclosure relate to utilizing data from a plurality of devices, some of which are not fitness devices, to collect, detect, and/or measure athletic data. In certain embodiments, one or more devices of BAN 102 (or any other network) may comprise a fitness or sporting device that is specifically designed for a particular sporting use. As used herein, the term "sporting device" includes any physical object that may be used or implicated during a specific sport or fitness activity. Exemplary sporting devices may include, but are not limited to: golf balls, basketballs, baseballs, soccer balls, footballs, powerballs, hockey pucks, weights, bats, clubs, sticks, paddles, mats, and combinations thereof. In further embodiments, exemplary fitness devices may include objects within a sporting environment where a specific sport occurs, including the environment itself, such as a goal net, hoop, backboard, portions of a field, such as a midline, outer boundary marker, base, and combinations thereof.

In this regard, those skilled in the art will appreciate that one or more sporting devices may also be part of (or form) a structure and vice-versa, a structure may comprise one or more sporting devices or be configured to interact with a sporting device. For example, a first structure may comprise a basketball hoop and a backboard, which may be removable and replaced with a goal post. In this regard, one or more sporting devices may comprise one or more sensors, such as one or more of the sensors discussed above in relation to FIGS. 1-3, that may provide information utilized, either independently or in conjunction with other sensors, such as one or more sensors associated with one or more structures. For example, a backboard may comprise a first sensor configured to measure a force and a direction of the force by a basketball upon the backboard and the hoop may comprise a second sensor to detect a force. Similarly, a golf club may comprise a first sensor configured to detect grip attributes on the shaft and a second sensor configured to measure impact with a golf ball.

Looking to the illustrative portable device 112, it may be a multi-purpose electronic device, that for example, includes a telephone or digital music player, including an IPOD®, IPAD®, or iPhone®, brand devices available from Apple, Inc. of Cupertino, California or Zune® or Microsoft® Windows devices available from Microsoft of Redmond, Washington. As known in the art, digital media players can serve as an output device, input device, and/or storage device for a computer. Device 112 may be configured as an input device for receiving raw or processed data collected from one or more devices in BAN 102, LAN 104, or WAN 106. In one or more embodiments, portable device 112 may comprise one or more components of computer device 114. For example, portable device 112 may be include a display 116, image-capturing device 118, and/or one or more data acquisition devices, such as any of the I/O devices 116-122 discussed above, with or without additional components, so as to comprise a mobile terminal.

a. Illustrative Apparel/Accessory Sensors

In certain embodiments, I/O devices may be formed within or otherwise associated with user's 124 clothing or accessories, including a watch, armband, wristband, necklace, shirt, shoe, or the like. These devices may be configured to monitor athletic movements of a user. It is to be understood that they may detect athletic movement during user's 124 interactions with computer device 114 and/or operate independently of computer device 114 (or any other device disclosed herein). For example, one or more devices in BAN 102 may be configured to function as an all-day activity monitor that measures activity regardless of the user's proximity or interactions with computer device 114. It is to be further understood that the sensory system 302 shown in FIG. 3 and the device assembly 400 shown in FIG. 4, each of which are described in the following paragraphs, are merely illustrative examples.

i. Shoe-Mounted Device

Figure 3:
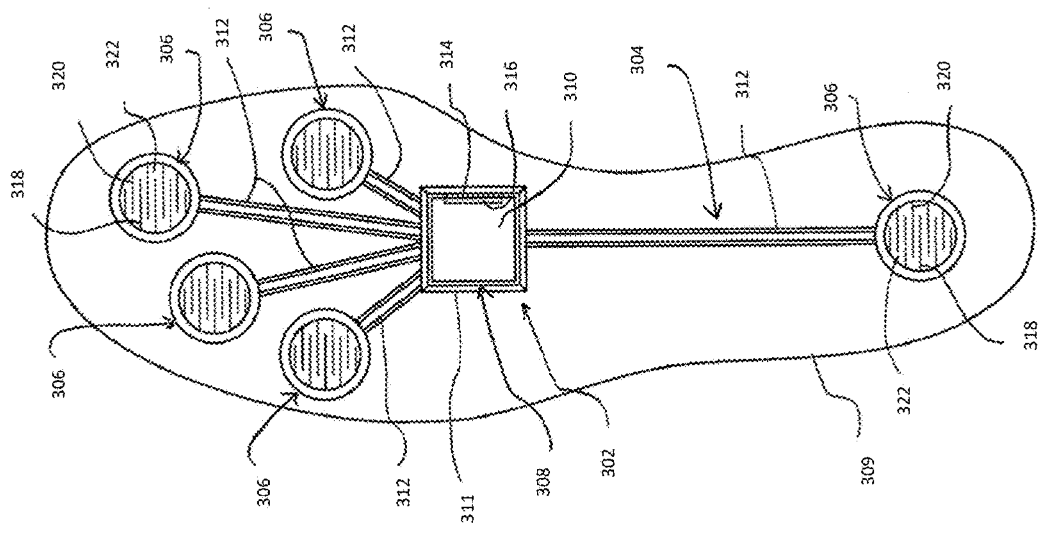
FIG. 3 shows an illustrative sensor assembly that may be worn by a user in accordance with example embodiments.

In certain embodiments, device 126 shown in FIG. 1, may comprise footwear which may include one or more sensors, including but not limited to those disclosed herein and/or known in the art. FIG. 3 illustrates one example embodiment of a sensor system 302 providing one or more sensor assemblies 304. Assembly 304 may comprise one or more sensors, such as for example, an accelerometer, gyroscope, location-determining components, force sensors and/or or any other sensor disclosed herein or known in the art. In the illustrated embodiment, assembly 304 incorporates a plurality of sensors, which may include force-sensitive resistor (FSR) sensors 306; however, other sensor(s) may be utilized. Port 308 may be positioned within a sole structure 309 of a shoe, and is generally configured for communication with one or more electronic devices. Port 308 may optionally be provided to be in communication with an electronic module 310, and the sole structure 309 may optionally include a housing 311 or other structure to receive the module 310. The sensor system 302 may also include a plurality of leads 312 connecting the FSR sensors 306 to the port 308, to enable communication with the module 310 and/or another electronic device through the port 308. Module 310 may be contained within a well or cavity in a sole structure of a shoe, and the housing 311 may be positioned within the well or cavity. In one embodiment, at least one gyroscope and at least one accelerometer are provided within a single housing, such as module 310 and/or housing 311. In at least a further embodiment, one or more sensors are provided that, when operational, are configured to provide directional information and angular rate data. The port 308 and the module 310 include complementary interfaces 314, 316 for connection and communication.

In certain embodiments, at least one force-sensitive resistor 306 shown in FIG. 3 may contain first and second electrodes or electrical contacts 318, 320 and a force-sensitive resistive material 322 disposed between the electrodes 318, 320 to electrically connect the electrodes 318, 320 together. When pressure is applied to the force-sensitive material 322, the resistivity and/or conductivity of the force-sensitive material 322 changes, which changes the electrical potential between the electrodes 318, 320. The change in resistance can be detected by the sensor system 302 to detect the force applied on the sensor 316. The force-sensitive resistive material 322 may change its resistance under pressure in a variety of ways. For example, the force-sensitive material 322 may have an internal resistance that decreases when the material is compressed. Further embodiments may utilize "volume-based resistance", which may be implemented through "smart materials." As another example, the material 322 may change the resistance by changing the degree of surface-to-surface contact, such as between two pieces of the force sensitive material 322 or between the force sensitive material 322 and one or both electrodes 318, 320. In some circumstances, this type of force-sensitive resistive behavior may be described as "contact-based resistance."

ii. Wrist-Worn Device

Figure 4:
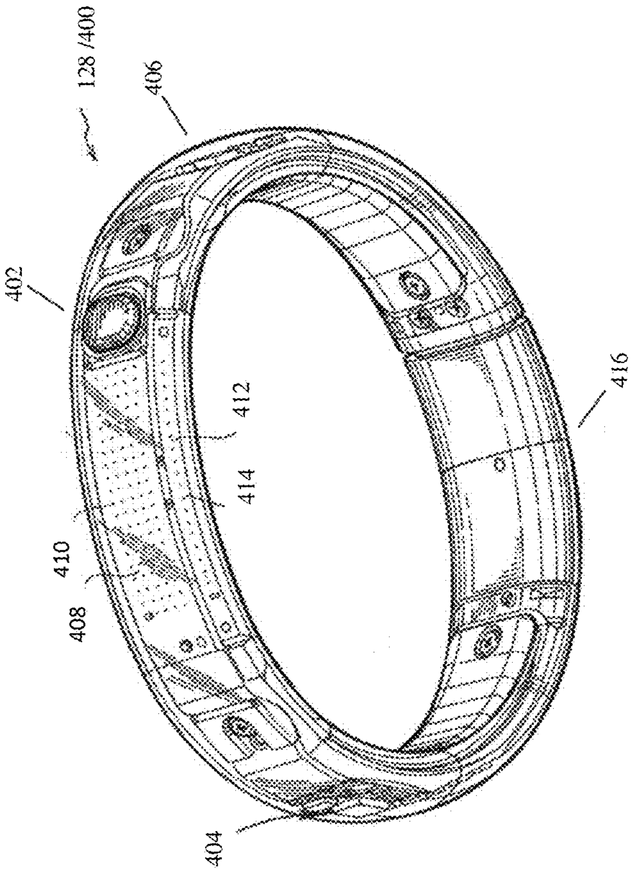
FIG. 4 shows another example sensor assembly that may be worn by a user in accordance with example embodiments.

As shown in FIG. 4, device 400 (which may resemble or comprise sensory device 128 shown in FIG. 1), may be configured to be worn by user 124, such as around a wrist, arm, ankle, neck or the like. Device 400 may include an input mechanism, such as a depressible input button 402 configured to be used during operation of the device 400. The input button 402 may be operably connected to a controller 404 and/or any other electronic components, such as one or more of the elements discussed in relation to computer device 114 shown in FIG. 1. Controller 404 may be embedded or otherwise part of housing 406. Housing 406 may be formed of one or more materials, including elastomeric components and comprise one or more displays, such as display 408. The display may be considered an illuminable portion of the device 400. The display 408 may include a series of individual lighting elements or light members such as LED lights 410. The lights may be formed in an array and operably connected to the controller 404. Device 400 may include an indicator system 412, which may also be considered a portion or component of the overall display 408. Indicator system 412 can operate and illuminate in conjunction with the display 408 (which may have pixel member 414) or completely separate from the display 408. The indicator system 412 may also include a plurality of additional lighting elements or light members, which may also take the form of LED lights in an exemplary embodiment. In certain embodiments, indicator system may provide a visual indication of goals, such as by illuminating a portion of lighting members of indicator system 412 to represent accomplishment towards one or more goals. Device 400 may be configured to display data expressed in terms of activity points or currency earned by the user based on the activity of the user, either through display 408 and/or indicator system 412.

A fastening mechanism 416 can be disengaged wherein the device 400 can be positioned around a wrist or portion of the user 124 and the fastening mechanism 416 can be subsequently placed in an engaged position. In one embodiment, fastening mechanism 416 may comprise an interface, including but not limited to a USB port, for operative interaction with computer device 114 and/or devices, such as devices 120 and/or 112. In certain embodiments, fastening member may comprise one or more magnets. In one embodiment, fastening member may be devoid of moving parts and rely entirely on magnetic forces.

In certain embodiments, device 400 may comprise a sensor assembly (not shown in FIG. 4). The sensor assembly may comprise a plurality of different sensors, including those disclosed herein and/or known in the art. In an example embodiment, the sensor assembly may comprise or permit operative connection to any sensor disclosed herein or known in the art. Device 400 and or its sensor assembly may be configured to receive data obtained from one or more external sensors.

iii. Apparel and/or Body Location Sensing

Element 130 of FIG. 1 shows an example sensory location which may be associated with a physical apparatus, such as a sensor, data acquisition unit, or other device. Yet in other embodiments, it may be a specific location of a body portion or region that is monitored, such as via an image capturing device (e.g., image capturing device 118). In certain embodiments, element 130 may comprise a sensor, such that elements 130*a* and 130*b* may be sensors integrated into apparel, such as athletic clothing. Such sensors may be placed at any desired location of the body of user 124. Sensors 130*a/b* may communicate (e.g., wirelessly) with one or more devices (including other sensors) of BAN 102, LAN 104, and/or WAN 106. In certain embodiments, passive sensing surfaces may reflect waveforms, such as infrared light, emitted by image-capturing device 118 and/or sensor 120. In one embodiment, passive sensors located on user's 124 apparel may comprise generally spherical structures made of glass or other transparent or translucent surfaces which may reflect waveforms. Different classes of apparel may be utilized in which a given class of apparel has specific sensors configured to be located proximate to a specific portion of the user's 124 body when properly worn. For example, golf apparel may include one or more sensors positioned on the apparel in a first configuration and yet soccer apparel may include one or more sensors positioned on apparel in a second configuration.

Figure 5:
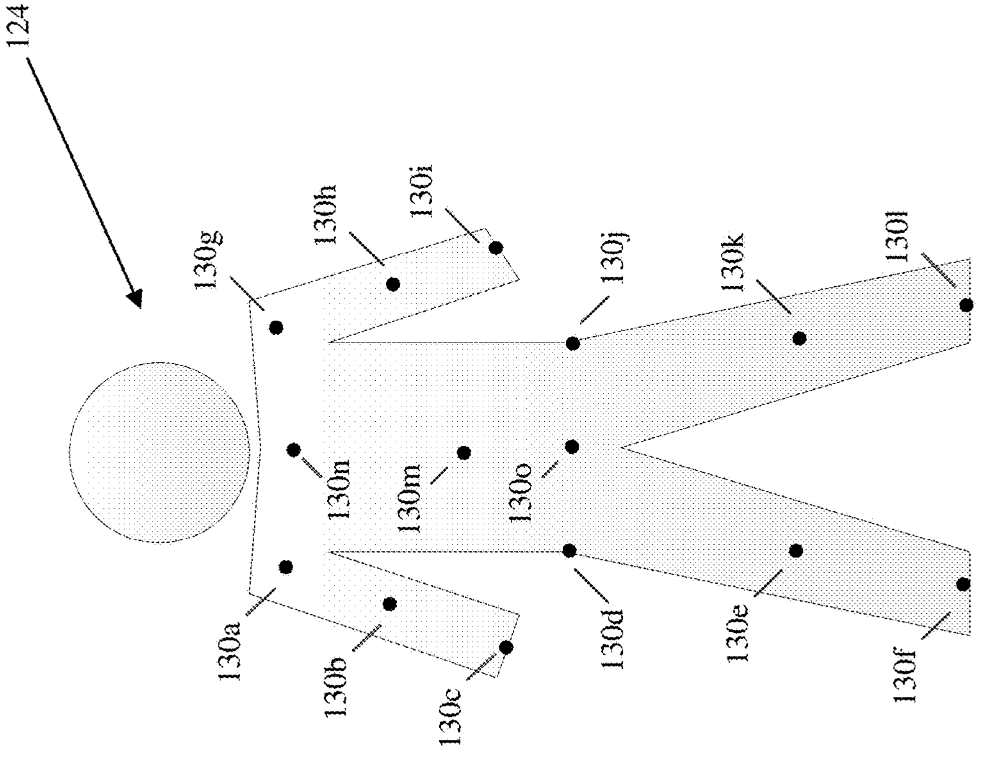
FIG. 5 shows illustrative locations for sensory input which may include physical sensors located on/in a user's clothing and/or be based upon identification of relationships between two moving body parts of the user.

FIG. 5 shows illustrative locations for sensory input (see, e.g., sensory locations 130*a*-130*o*). In this regard, sensors may be physical sensors located on/in a user's clothing, yet in other embodiments, sensor locations 130*a*-130*o* may be based upon identification of relationships between two moving body parts. For example, sensor location 130*a* may be determined by identifying motions of user 124 with an image-capturing device, such as image-capturing device 118. Thus, in certain embodiments, a sensor may not physically be located at a specific location (such as one or more of sensor locations 130*a*-130*o*), but is configured to sense properties of that location, such as with image-capturing device 118 or other sensor data gathered from other locations. In this regard, the overall shape or portion of a user's body may permit identification of certain body parts. Regardless of whether an image-capturing device is utilized and/or a physical sensor located on the user 124, and/or using data from other devices, (such as sensory system 302), device assembly 400 and/or any other device or sensor disclosed herein or known in the art is utilized, the sensors may sense a current location of a body part and/or track movement of the body part. In one embodiment, sensory data relating to location 130*m* may be utilized in a determination of the user's center of gravity (a.k.a, center of mass). For example, relationships between location 130*a* and location(s) 130*f*/130*l* with respect to one or more of location(s) 130*m*-130*o* may be utilized to determine if a user's center of gravity has been elevated along the vertical axis (such as during a jump) or if a user is attempting to "fake" a jump by bending and flexing their knees. In one embodiment, sensor location 1306*n* may be located at about the sternum of user 124. Likewise, sensor location 130*o* may be located approximate to the naval of user 124. In certain embodiments, data from sensor locations 130*m*-130*o* may be utilized (alone or in combination with other data) to determine the center of gravity for user 124. In further embodiments, relationships between multiple sensor locations, such as sensors 130*m*-130*o*, may be utilized in determining orientation of the user 124 and/or rotational forces, such as twisting of user's 124 torso. Further, one or more locations, such as location(s), may be utilized as (or approximate) a center of moment location. For example, in one embodiment, one or more of location(s) 130*m*-130*o* may serve as a point for a center of moment location of user 124. In another embodiment, one or more locations may serve as a center of moment of specific body parts or regions.

A user may perform a workout, such running a particular route or distance. In some embodiments, a device such as device assembly 400 shown in FIG. 4, associated with the user, may capture information about the workout. In some embodiments, the information may be provided to a server, such as the server 111, where it may be associated with the user and stored. In some embodiments, the information may later be requested by the user. For example, a user might later want to see highlights of the workout, including statistics such as distance covered and duration of run. In some embodiments, the information may be used by the server 111 to augment the statistical data in order to create a media presentation corresponding to aspects of the workout. In some embodiments, the media presentation may include images, sound and video, including media corresponding to aspects of the user's workout.

Figure 6:
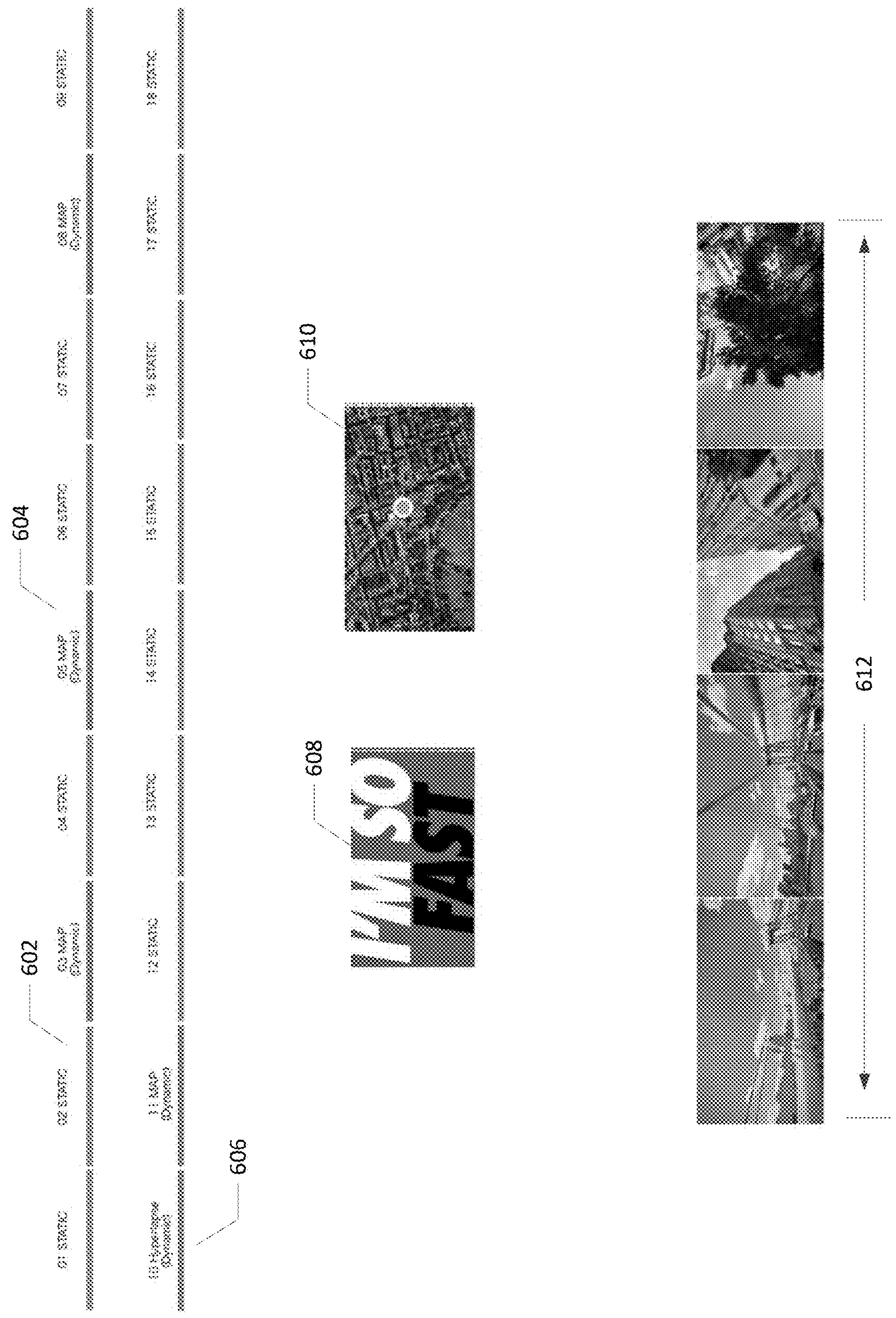
FIG. 6 illustrates segments of an example media presentation in accordance with aspects of the present disclosure.

FIG. 6 illustrates segments of an example media presentation in accordance with aspects of the present disclosure. In various embodiments, a media presentation may include any number of static and/or dynamic segments or portions. Static segments, such as the segment depicted as 602, may represent or comprise pre-prepared media content, such as branding visuals, motivational text 608, images of speed metaphors (e.g. a running cheetah), color segments, and countdown numerals, among others. Dynamic segments, such as segments 604 and 606, may represent or comprise segments that correspond to aspects of the user's specific activity and/or workout. In some embodiments, a dynamic segment may include a map 610 related to the user's route, for example, the user's start or finish location. In certain embodiments, the entire route, or distance the user traversed over during the athletic activity may be provided. In some embodiments, a dynamic segment may include images or videos (e.g. a collection of images shown in a sequential manner), such as the hyperlapse video 612, corresponding to various locations along or on a user's workout route. While the term "hyperlapse" is used, those skilled in the art will appreciate that other trick play mechanisms may be employed in accordance with the disclosed aspects herein. Thus, this disclosure is not limited to only "hyperlapsed" presentations. In some embodiments, the media presentation may include segments presenting user identifying information and/or statistics corresponding to the workout. Such statistics may be obtained, either directly or indirectly, from one or more sensors, including those disclosed herein. In one embodiment, at least one sensor is located on the same electronic device as the image capturing device.

Figure 7:
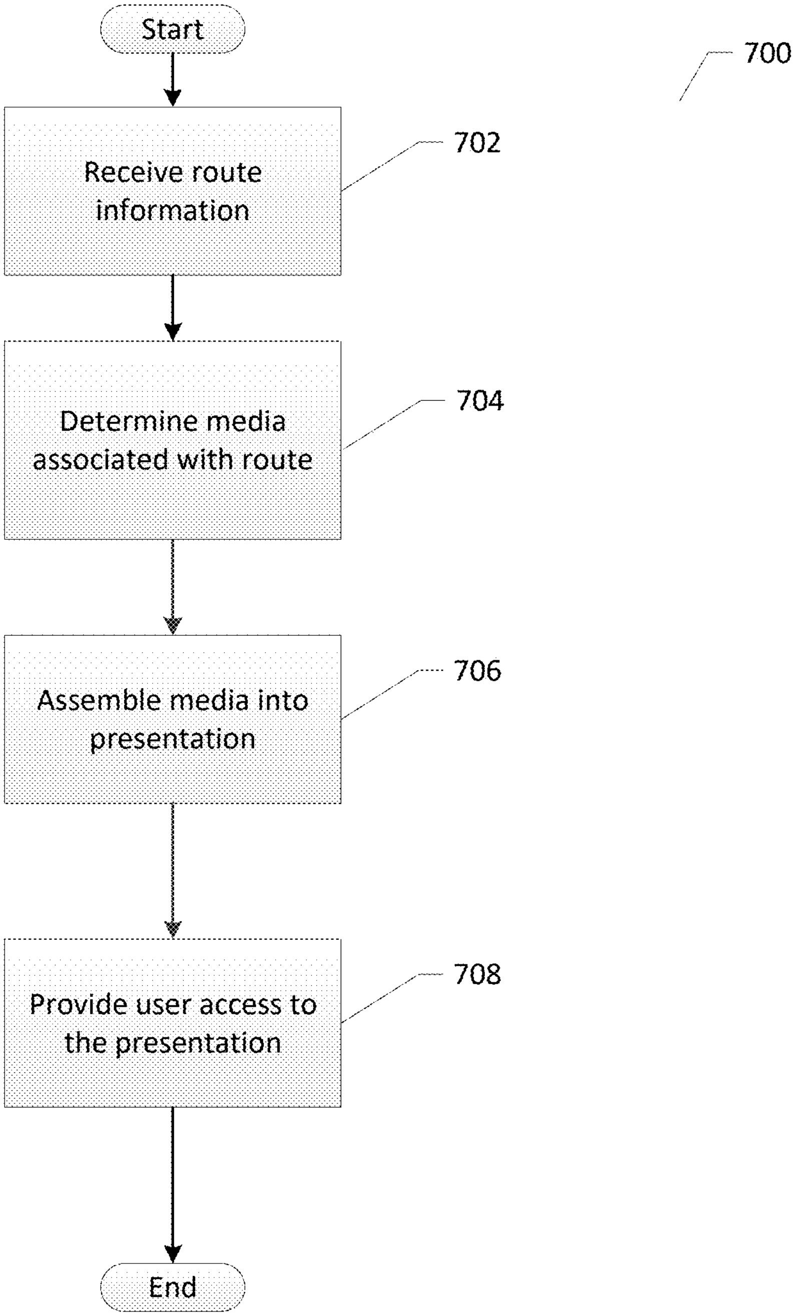
FIG. 7 illustrates a flow diagram of an example process in accordance with aspects of the present disclosure.

FIG. 7 illustrates a flow diagram of an example process 700 in accordance with aspects of the present disclosure. At step 702, route information may be received. The route information may have originated from a user device, such as I/O devices 116-122. In some embodiments, portable electronic device 112 may include GPS capabilities and may provide route information, including GPS coordinates, during a user's workout session. Those skilled in the art will realize that other methodologies, such as triangulation, may be used alone or in combination with GPS to obtain route information. Further, route information may be relative as opposed to specific GPS coordinates. The route information may comprise stored information, saved from a prior workout session for that same user or another athlete. In certain embodiments, such as when a user performs a workout without capturing location information, step 702 may include receiving workout information, such as statistics associated with the workout. In some embodiments, the workout information may be received in addition to route information.

At step 704, media associated with the route may be determined. In some embodiments, maps of various points along the route may be determined. In other embodiments, images may be determined. In still other embodiments, hyperlapse video of locations along the route may be determined. For example, previously stored images taken along a street may be assembled into a video of that segment of the street. In some embodiments, the images may represent various view points, including a 360 degree view. The assembled images may remind the user or help the user to relive the workout visually. In some embodiments, for example where route information is not provided, media associated with the workout activity in general may be determined. In one embodiment, locational data at a first point along the route may be selected. It may be selected based upon its proximity to a landmark, distance to a sporting venue, park, or other locations. In yet other embodiments, a first location may be selected based upon the user's performance, such as the user running a certain pace, scoring a goal, achieving a new record. In yet further embodiments, a location may be selected based on the locational data in combination with the user's athletic data. In other embodiments, a second location may be selected based upon one or more factors, including but not limited to the user's athletic data and/or locational data. In certain embodiments, a first and a second location may be used to determine a path, distance or view located between two locations, and a point of interest or other location along that path, distance or view may be selected.

At step 706, the media may be assembled into a media presentation. In some embodiments, static segments may be included in the media presentation. For example, various images or text may be interspersed among the media described above. In some embodiments, images taken from a device not associated with at least one of: the user, their current performance and/or past performance, may be utilized. As one example, one or more images may be obtained from sources not available or even ever available to the user. In certain embodiments, it may be determined that the user is located along a predefined threshold, such as within a lakefront, therefore, in certain embodiments, aerial footage of the lakefront may be selected. In other aspects images may be selected from various sources, such as social media, search engines, databases, etc. Weather data may also be used in certain embodiments to select images that correspond to similar weather or lighting patterns, such as time of day and/or overcast conditions. In different aspects the weather data may be detected automatically, such as by retrieving weather data during the workout from an external weather database. In some aspects the user may be prompted to accept or change the weather data, such that a user who ran during undesirable conditions may wish to receive a hyperlapse video based on ideal conditions or vice versa. In some embodiments, branding visuals may be included in some segments. In other embodiments, motivational text or images may be included. In still other embodiments, various visual depictions of performance may be included. For example, a speedy animal, such as a cheetah, may be depicted in an image or shown in a video clip or moving graphic. Various celebratory messages may be included in some embodiments. In some embodiments, one or more segments may include user identifying information, such as a user first name or a user image. In some embodiments, various statistics may be depicted in one or more segments, including statistics such as distance covered during the workout, elapsed time, speed per unit distance, calories burned, maximum heart rate, date/time of workout, and ambient temperature, among others. In still other embodiments, other information corresponding to the workout, such as the workout location, may be provided.

At step 708, a link or other mechanism for accessing the presentation may be provided to the user. In some embodiments, the link may include provisions making it easy for the user to share the media presentation with other users.

Figure 8:
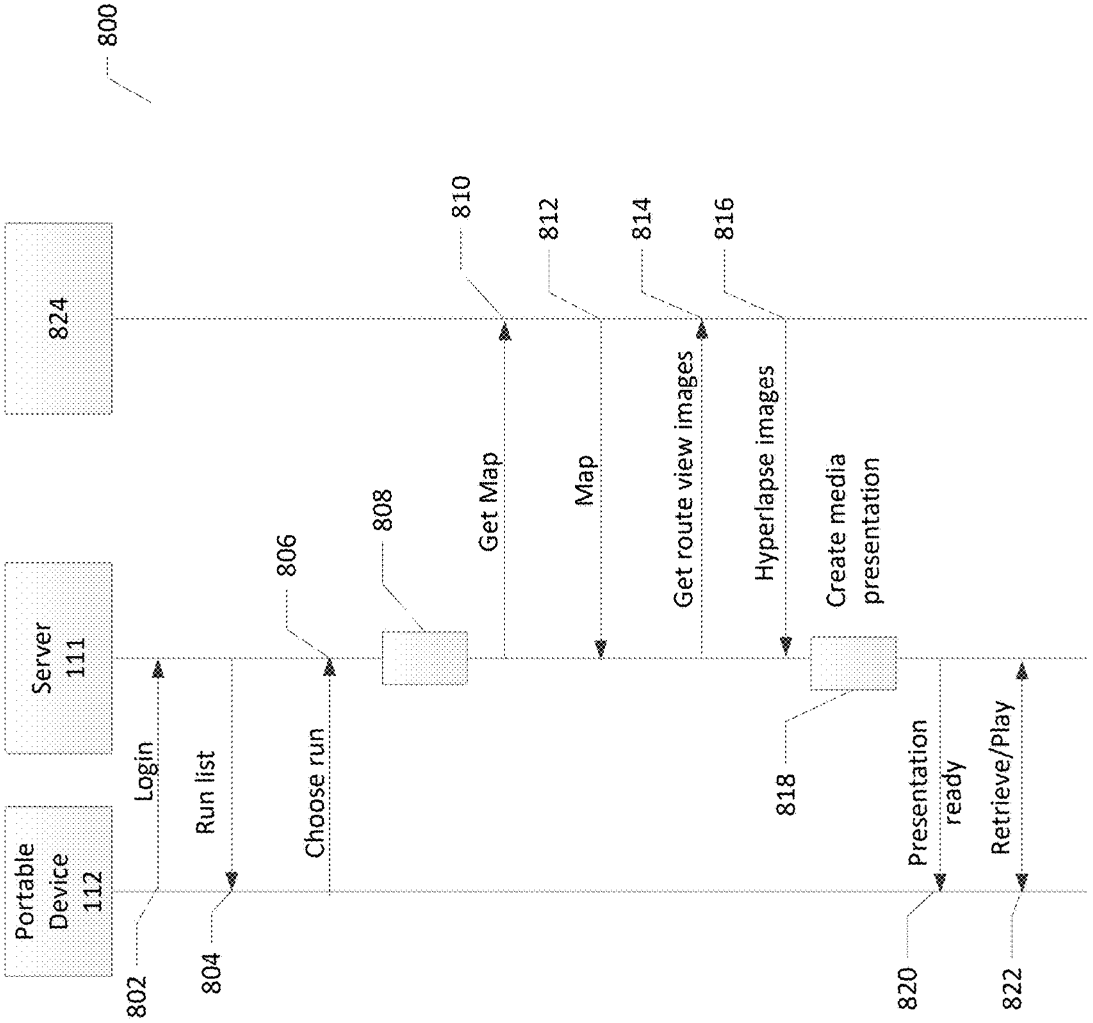
FIG. 8 illustrates a flow diagram of an example process in accordance with aspects of the present disclosure.

FIG. 8 illustrates a flow diagram of an example process 800 in accordance with aspects of the present disclosure. At step 802, a user of the portable device 112 may login to the server 111. Although the portable device 112 is depicted and used for discussion in relation to FIG. 8, any computing device 200 may be used.

At step 804, the server 111 may respond to the login with a list of prior workouts. This list may be referred to as a "run list" and may be a listing of prior runs accomplished by the user.

At step 806, the user may select one of the runs from the run list and the portable device 112 may send an indication of the selected run to the server 111.

At step 808, the server 111 may access a database in order to retrieve route or other run data corresponding to the selected run. For example, run data may include date, time, distance, pace of run, latitude & longitude of run activity, first name, user ID, and activity ID. The table below depicts some of the types of information that may be in the database.

| Data Captured | Reason |
|---|---|
| First Name | To show user's name on generated movie to personalize. |
| UPMID | To pull user info. |
| NUID | To identify user. |
| Access Token | To pull user info and run data. |
| Refresh Token | To fetch new token. |
| Activity ID | To identify specific run data. |
| Date, time, distance, pace of run | To verify valid runs and create Hyperlapse movie. |

-continued

| Data Captured | Reason |
|---|---|
| Latitude & Longitude of run activity | To show user's running course on movie via maps API. |

In some embodiments, route information may be provided to a dynamic media server 824 in a request for a map in step 810. At step 812, the map may be received by the server 111.

At step 814, route information may be provided to the dynamic server 824 in a request to retrieve hyperlapse video. The requested hyperlapse video may be received in step 816. In some embodiments, an application program interface (API) may be provided by the dynamic server 824 which enables hyperlapse video to be requested by server 111. In some embodiments, the hyperlapse video may be requested by providing segment, coordinates or other location information and the returned hyperlapse video may include images associated with the location. For example, images taken along a street may be returned when the segment in the request corresponds to the street.

At step 818, the server 111 may create a media presentation, including the requested map and/or hyperlapse video. In some embodiments, various branded video or image segments may be retrieved from a database by server 111 and included in the media presentation. In other embodiments, motivational images or sounds may be included. In some embodiments, the media presentation may include content related to the user's workout as well as standard content, such as content that may be used in media presentations of other users.

At step 820, the server 111 may provide information to portable device 112 to enable retrieval and playback of the media presentation. For example, a link or command execution button may be provided for display on the portable device 112. At step 822, portable device 112 may present the media presentation, for example, by retrieving portions from the server 111.

Figure 9:
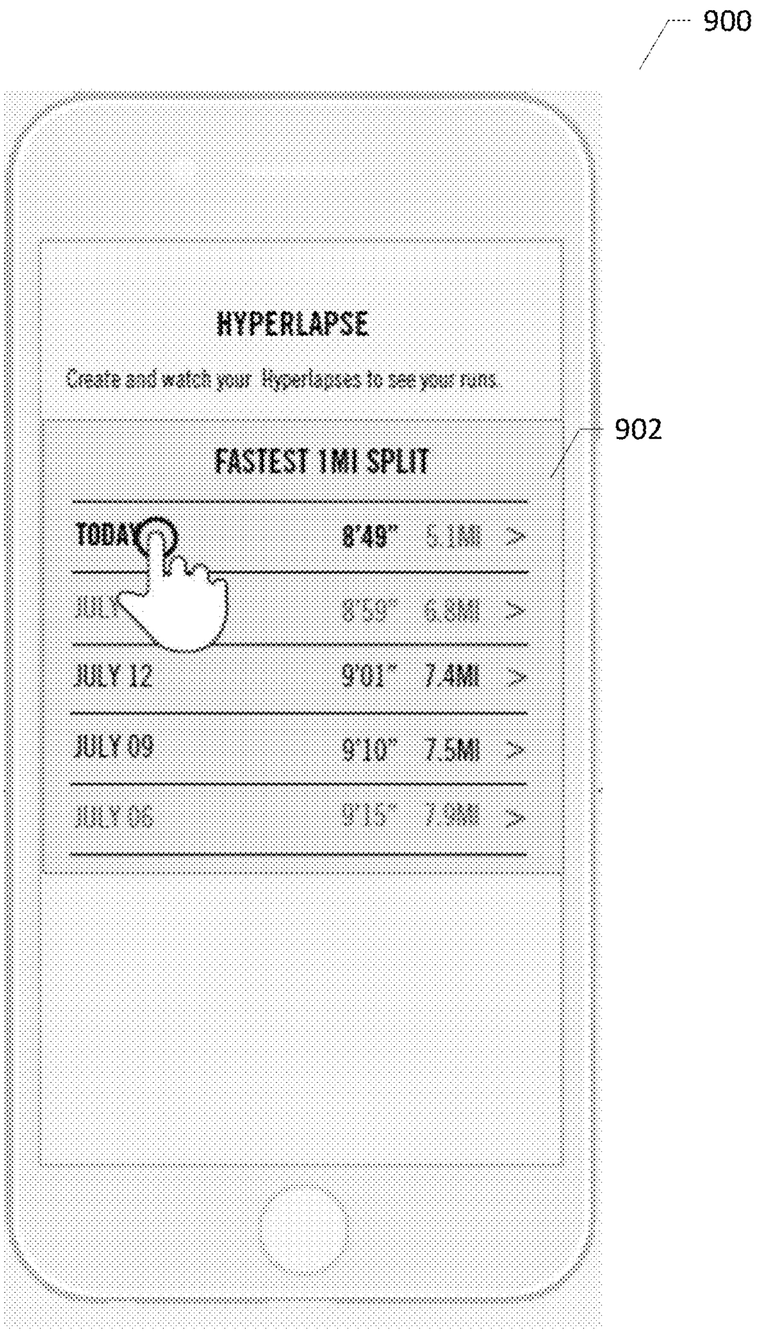
FIG. 9 illustrates an example user interface 900 as may be provided by device 112 in in accordance with aspects of the present disclosure.

FIG. 9 illustrates an example user interface 900 as may be provided by device 112 in response to receiving the run list in step 704 of FIG. 7. The run list 902 may provide a listing of recent runs by the user. In some embodiments, the runs in the list may be sorted by distance or duration, among others. As depicted in FIG. 9, the run list may be sorted in increasing order according to mile split times. In various embodiments, the user may select a run from the list and be presented with a media presentation corresponding to the selected run.

In some embodiments, the user may be presented with an option to send or otherwise share the media presentation to one or more other users, for example, in order to share with users registered with various social networking websites. In various embodiments, the media presentation may be provided in multiple lengths or sizes to enable sharing to various social networking sites.

In some embodiments, the methods may include receiving, by a computing device, route information from a first user, determining media associated with the route, assembling the media into a presentation, and providing access to the presentation.

In some embodiments, the route information may include way points, GPS coordinates, and path segments.

In some embodiments, the route information may correspond to a path taken by the first user during a previous workout.

In some embodiments, the route information may be received from a user device, such as a GPS enabled watch, a GPS enabled mobile phone or from another location enabled exercise accessory.

In some embodiments, the presentation may include user identifying information, such as a user name, user ID or user image.

In some embodiments, the presentation may include statistics or data corresponding to aspects of the first user's traversal of the route.

In some embodiments, the presentation may include predetermined visuals or audio.

In some embodiments, the presentation may include one or more messages to the first user, such as a congratulatory or motivational message.

In some embodiments, the presentation may include location information.

In some embodiments, the presentation may be stored.

In some embodiments, the presentation may be shared by the first user to a second user.

In some embodiments, the presentation may include images or videos corresponding to locations along the route.

In some embodiments, the methods may include providing, by a user device, route information; receiving media associated with the route information, and assembling the media into a presentation.

In some embodiments, the method may include analyzing the route information and determine location data associated with the route information, and based upon that analysis, retrieving images and image data associated with the location data. In some embodiments the images associated with the location data may be presented as at least a portion of the hyperlapse media presentation. In these embodiments, a user may be able to view images associated with different locations along their run as they watch the hyperlapse video.

In other embodiments, the method may include analyzing the route information and determine location data and timestamp associated with the route information, and based upon that analysis, retrieving images and image data associated with both the location data and the timestamp data. In some embodiments the images associated with the location data and timestamp data may be presented as at least a portion of the hyperlapse media presentation. In different aspects the timestamp data may relate to time of day, day of the week, weather, month, season, year, or combinations therein. In certain embodiments, a user may be able to view images that were taken at similar locations and conditions as which the user experienced during the workout. For example, a user who recorded a workout while it was afternoon and sunny would receive images related the same conditions. In some aspects the image data may be received from social media sites, such as Instagram, Facebook, Twitter, Foursquare, or other sites where user images are shared, such that the hyperlapse video includes images taken at similar times and locations as the user was experiencing during the workout. In further aspects the image data may be retrieved from the user's device, such as a cell phone. In these aspects, the method could identify images stored on a user's phone associated with the location data and timestamp data to use user taken images in the hyperlapse video. In further aspects a user may be able to alter the location data and timestamp data used for image retrieval.

In some embodiments, various steps of the methods described herein may be implemented in a user device or a server.

In some embodiments, the methods as described herein may be implemented by computer instructions stored on computer readable memory that when executed by a processor, cause the processor to perform the methods as described herein.

In some embodiments, the media presentation may be provided to a user as an award for reaching a personal best, such as a best elapsed time to cover a certain distance.

In some embodiments, a user may be provided with the ability to select which location or segment of the workout to create the hyperlapse video from. For example, if a user were running a route that included a scenic segment, such as a waterfront, the user may select the waterfront as a segment from which to create a hyperlapse video from, because it has better scenery to share with you friends.

In some embodiments, a user may be provided with the ability to manually request creation of the media presentation post-run with a web-based application. In some embodiments, a user may be provided an interface via a mobile device, such as portable electronic device 112, from which the media presentation may be requested post-run.

In some embodiments, a user may be provided with the ability to select where they want to create hyperlapse video from by using a device interface during their run. For example, a user may be running a route which includes a waterfront segment. Upon reaching the waterfront, the user may press a button or otherwise actuate an interface in a portable electronic device to indicate that they want hyperlapse video of the waterfront segment. This information may be provided to server 111 and/or stored as data associated with the run.

In some embodiments, a user may be provided with the ability to see a hyperlapse video of larger parts of the run in fast chunks and choose one or more of the chunks for the presentation.

In some embodiments, editing capabilities may be provided so that the user may modify the hyperlapse video and/or the media presentation.

In some embodiments, certain segments of the run may be automatically included in a hyperlapse video. For example, segments where particular achievements may be identified from collected data and portions of these segments may be presented in hyperlapse video. In various embodiments, the fastest period within the run, the toughest part by incline, the point of highest heart rate occurrence, or other identified achievement segment may be identified and hyperlapse video provided for the segment.

In some embodiments, a segment may be identified in which the user was virtually cheered by a friend and a visual of friend who cheered may be included in the media presentation.

What is claimed:

1. A computer-implemented method, comprising:

receiving, from a sensor device associated with a user, athletic activity data collected by the sensor during a user's first workout at a first location during a first time period and the user's second workout at a second location during a second time period;

calculating, from at least a portion of the received athletic activity data, an athletic performance metric of the user;

retrieving, from a device associated with the user or from a first social media site, a first set of image data, where the first set of image data includes images associated with the first location;

retrieving, from the device associated with the user or from a first social media site, a second set of image data, where the second set of image data includes images associated with the second location;

receiving a first input from the user selecting a portion of the first set of image data;

receiving a second input from the user selecting a portion of the second set of image data;

generating, based on the selected portion of the first set of image data, the selected portion of the second set of image data, and the athletic performance metric of the user, a hyperlapse media presentation to be shared on the first social media site, wherein the hyperlapse media presentation includes a plurality of hyperlapse media presentation segments, and wherein at least a first hyperlapse media presentation segment is associated with the first workout and at least a second hyperlapse media presentation segment is associated with the second workout;

presenting to the user a list of the hyperlapse media presentation segments, each of the hyperlapse media presentation segments including an associated route information data and an athletic performance metric of the user; and, providing, based on receiving a user selection of at least a portion of the list, a unique identification to a portable device, comprising at least one of a memory and a processor, configured to retrieve the hyperlapse media presentation from a server.

2. The computer-implemented method of claim 1, further comprising:

analyzing the received athletic activity data to determine a peak period of the athletic performance metric within the received athletic activity data; and, identifying the peak period in at least a portion of the hyperlapse media presentation.

3. The computer-implemented method of claim 1, further comprising:

storing the hyperlapse media presentation at a memory; and, sorting a plurality of hyperlapse media presentations at the memory according to a user selected criteria.

4. The computer-implemented method of claim 1, wherein the first set of image data is retrieved from at least one social media account associated with the user.

5. The computer-implemented method of claim 1, further comprising:

receiving, from the sensor device associated with the user, athletic activity data collected by the sensor during a third workout of the user at a third location during a third time period;

retrieving, from a device associated with the user or from a social media site, a third set of image data, where the third set of image data includes images associated with the third location; and, updating the hyperlapse media presentation to include at least a portion of the third set of image data.

6. The computer-implemented method of claim 1, further comprising:

calculating, from at least a portion of the received athletic activity data, an athletic performance metric of the user from the second workout; and, updating the hyperlapse media presentation to identify the athletic performance metric of the user from the second workout.

7. The computer-implemented method of claim 1, further comprising:

displaying the media presentation at a first display interface of the portable device.

8. The computer-implemented method of claim 1, wherein the second set of image data is retrieved from at least one social media account associated with the user.

9. The computer-implemented method of claim 1, further comprising:

generating an updated version of the hyperlapse media to be shared on a second social media site.

10. The computer-implemented method of claim 1, further comprising:

classifying the athletic activity data as an athletic activity; and, identifying the athletic activity in at least a portion of the hyperlapse media presentation.

11. The computer-implemented method of claim 1, further comprising:

retrieving from a database, additional first image data associated with the first location.

12. A non-transitory computer-readable medium comprising computer-executable instructions that when executed by a processor are configured to cause the processor to perform at least:

capture sensor data generated by a sensor as a result of an athletic activity of a user during a first workout at a first location during a first time period and during a second workout at a second location during a second time period, where the first time period and second time period do not overlap;

retrieve first image data from a device associated with the user or from a social media site, wherein the first image data includes images captured of the user during a third time period that does not overlap with the first time period;

retrieve second image data from a device associated with the user or from a social media site, wherein the second image data includes images captured of the user during the second workout;

calculate, from at least a portion of the captured sensor data, first athletic performance data of the user during the first workout and second athletic performance data of the user during the second workout;

communicate the first athletic performance data, the second athletic performance data, the first image data, and the second image data to a server;

generate, at the server and based on the first athletic performance data, the second athletic performance data, the first image data, and the second image data, a first hyperlapse media presentation of a first length to be shared on a first social media site, wherein the hyperlapse media presentation includes a plurality of hyperlapse media presentation segments, and wherein at least a first hyperlapse media presentation segment is associated with the first workout and at least a second hyperlapse media presentation segment is associated with the second workout; and present to the user a list of the plurality of hyperlapse media presentation segments, each of the hyperlapse media presentation segments including associated route information data and an athletic performance metric of the user.

13. The non-transitory computer-readable medium of claim 12, wherein the computer-executable instructions further cause the processor to perform at least:

generate, at the server and based on the first athletic performance data, the second athletic performance data, the first image data, and the second image data, a second hyperlapse media presentation of a second length to be shared on a second social media site.

14. The non-transitory computer-readable medium of claim 12, wherein the computer-readable medium further comprises instructions, that when executed further cause the processor to perform at least:

provide instructions to a portable device, comprising at least one of a memory and a processor, configured to share the first hyperlapse media presentation to a network.

15. The non-transitory computer-readable medium of claim 12, wherein the computer-readable medium further comprises instructions, that when executed further cause the processor to perform at least:

classify the first athletic performance data as an athletic activity; and, identify the athletic activity in at least a portion of the first hyperlapse media presentation.

16. The non-transitory computer-readable medium of claim 15, wherein the athletic activity is selected from the group of: walking, jogging, running, cycling, skating, high-intensity training, yoga, weightlifting, and combinations thereof.

17. The non-transitory computer-readable medium of claim 12, wherein the computer-readable medium further comprises instructions, that when executed further cause the processor to perform at least:

retrieve from at least one social media account not associated with the user, a third set of image data, where the third set of image data is associated with the first location; and, update the first hyperlapse media presentation to include the third set of image data.

18. An apparatus, comprising:

a portable device comprising:

a processor;

at least one sensor configured to capture sensor data generated by an athletic activity of a user;

a user interface configured to display graphical information to a user; and a non-transitory computer-readable medium comprising computer-executable instructions that when executed by the processor, cause the processor to perform at least:

capture sensor data generated by the at least one sensor as a result of an athletic activity of a user during a first workout at a first location during a first time period and during a second workout at a second location during a second time period, the sensor data comprising athletic activity data;

retrieve, from a device associated with the user or from a social media site, a first set of image data associated with the first location, retrieve, from a device associated with the user or from a social media site, a second set of image data associated with the second location;

use the processor to calculate, from at least a portion of the captured athletic activity data, an athletic performance metric of the user;

generate a first hyperlapse media presentation of a first length to be shared on a first social media site, wherein the first hyperlapse media presentation includes a plurality of hyperlapse media presentation segments, and wherein at least a first hyperlapse media presentation segment is associated with the first workout and at least a second hyperlapse media presentation segment is associated with the second workout; and, provide a unique identification to a portable device, comprising at least one of a memory and a processor, configured to retrieve the hyperlapse media presentation from a server.

19. The apparatus of claim 18, wherein the first hyperlapse media presentation further includes images from a social media account not associated with the user.

20. The apparatus of claim 19, wherein the computer-readable medium further comprises instructions, that when executed further cause the processor to perform at least:

generate, a second hyperlapse media presentation of a second length to be shared on a second social media site.

* * * * *